US011636011B2

(12) United States Patent
Rachapudi et al.

(10) Patent No.: US 11,636,011 B2
(45) Date of Patent: *Apr. 25, 2023

(54) METHODS AND SYSTEMS FOR PROTECTING MULTITENANT DATABASES IN NETWORKED STORAGE SYSTEMS

(71) Applicant: NETAPP, INC., San Jose, CA (US)

(72) Inventors: Amarnath Rachapudi, Bangalore (IN); Vasantha Prabhu, Bangalore (IN); Karkala Pallavi Puranik, Bangalore (IN); Kumar Dawani, Indore (IN)

(73) Assignee: NETAPP, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,621

(22) Filed: Jul. 6, 2022

(65) Prior Publication Data

US 2022/0350712 A1 Nov. 3, 2022

Related U.S. Application Data

(63) Continuation of application No. 16/852,310, filed on Apr. 17, 2020, now Pat. No. 11,467,927.

(51) Int. Cl.
*G06F 11/14* (2006.01)

(52) U.S. Cl.
CPC ...... *G06F 11/1469* (2013.01); *G06F 2201/80* (2013.01)

(58) Field of Classification Search
None
See application file for complete search history.

(56) References Cited

U.S. PATENT DOCUMENTS

| | | |
|---|---|---|
| 7,885,938 B1 | 2/2011 | Greene et al. |
| 10,198,327 B1 | 2/2019 | Gopinath et al. |
| 2008/0162483 A1* | 7/2008 | Becker ............... G06F 21/6218 707/999.009 |
| 2008/0162491 A1 | 7/2008 | Becker et al. |
| 2015/0254142 A1 | 9/2015 | Wagmann |
| 2017/0353444 A1* | 12/2017 | Karangutkar ......... H04L 63/102 |
| 2018/0373604 A1 | 12/2018 | Martin et al. |
| 2019/0311040 A1 | 10/2019 | Nayak et al. |
| 2021/0191903 A1 | 6/2021 | Shetty et al. |

OTHER PUBLICATIONS

Bauer et al.; SAP HANA on NetApp FAS Systems with Fibre Channel Protocol; NetApp; Sep. 2019; TR-4384; 34 pages.

* cited by examiner

*Primary Examiner* — Eddy Cheung
(74) *Attorney, Agent, or Firm* — Loza & Loza, LLP; Tejinder Singh

(57) ABSTRACT

Methods and systems for restoring a tenant database of a multitenant database system with multiple tenant databases is provided. In response to a request to restore a first tenant database, a system verifies that the first tenant database is present in the multitenant system database system with a same identifier when a backup of the first tenant database was taken during a backup operation and when the restore request was received. A restore method is selected based on a storage type used for storing the first tenant database. The selected restore method is executed for restoring the first tenant database utilizing an internal file associated with the first tenant database, while processing requests for other tenant databases.

20 Claims, 9 Drawing Sheets

METHODS AND SYSTEMS FOR PROTECTING MULTITENANT DATABASES IN NETWORKED STORAGE SYSTEMS

CROSS-REFERENCE TO RELATED APPLICATIONS

This patent application claims priority of and is a continuation of U.S. patent application Ser. No. 16/852,310, filed on Apr. 17, 2020, now U.S. Pat. No. 11,467,927, the disclosure of which is incorporated herein by reference in its entirety.

TECHNICAL FIELD

The present disclosure relates to networked storage systems and more particularly to, protecting and restoring a tenant database of a multitenant database system.

BACKGROUND

Various forms of storage systems are used today. These forms include direct attached storage (DAS) systems, network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are used by different applications, for example, multitenant database systems, electronic mail (email) servers, virtual machines executed within virtual machine environments (for example, a hypervisor operating environment) and others to store and protect data using backups.

A multitenant database system enables a plurality of independent tenant databases to store information using a single database instance. An example of a multitenant database system is the SAP HANA Multitenant Database Container (MDC) system provided by SAP Inc. (without derogation of any trademark rights of SAP Inc.).

Conventional storage systems typically do not enable restoring a specific tenant database without impacting other tenant databases of the multitenant database system. To restore the specific tenant database stored using a storage area network (SAN) logical unit number (LUN), conventional storage systems first restore the entire multitenant database system with all the tenant databases and then restore the specific tenant database. During a restore process, all the tenant databases become unavailable for a certain duration. This is disruptive for a tenant that does not have to be restored. Continuous efforts are being made to develop computing technology to efficiently backup and restore a specific tenant database in the multitenant database system while reducing disruption to other tenant databases.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general-purpose processor, hardware, firmware and a combination thereof. For example, a component may be, but is not limited to being, a process running on a processor, a hardware-based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

Figure 1A:
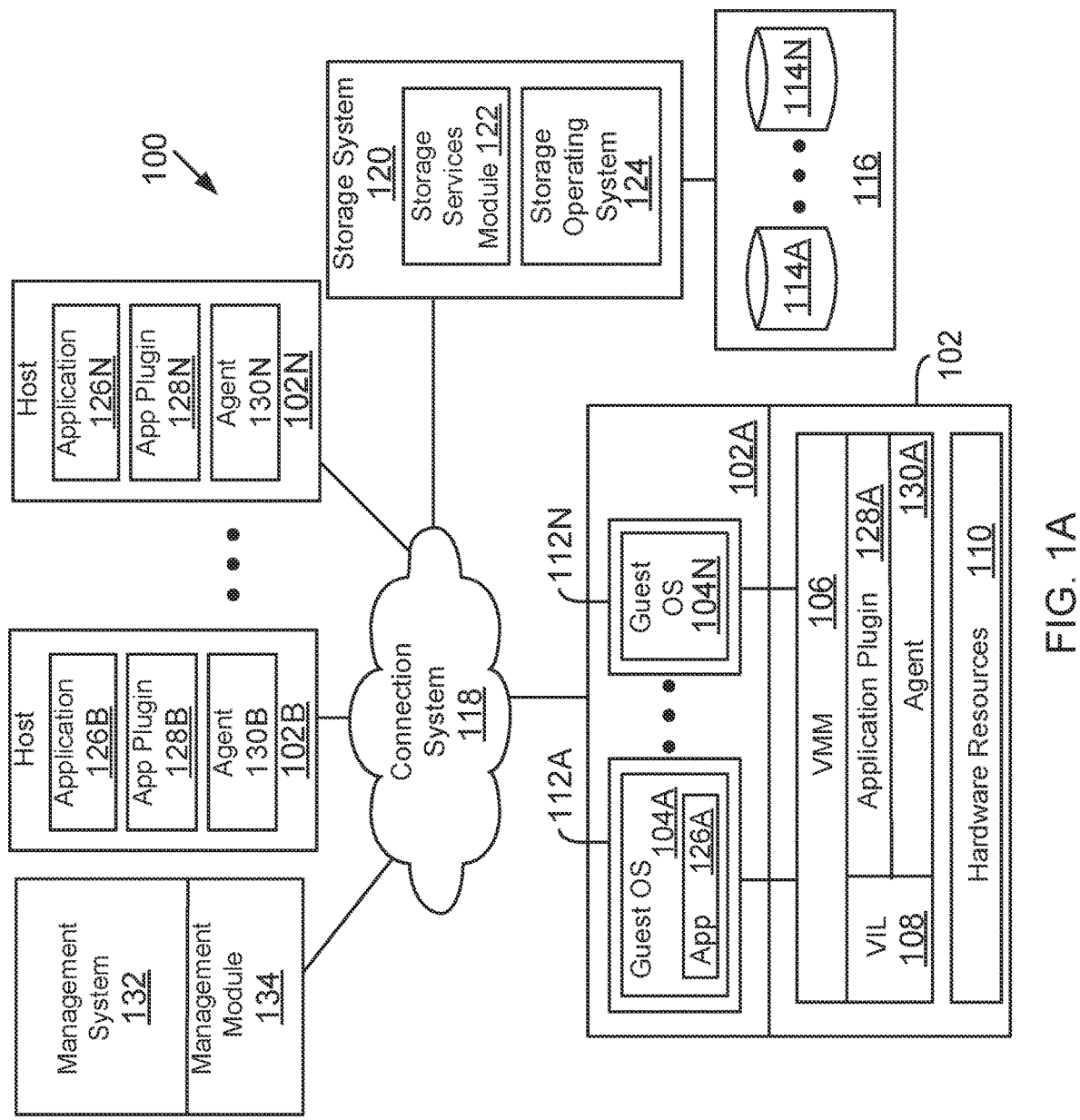
FIG. 1A shows an example of an operating environment for the various aspects of the present disclosure.

System 100: FIG. 1A shows an example of a system 100, to implement the various adaptive aspects of the present disclosure. In one aspect, system 100 includes computing systems 102A-102N (shown as host 102A-102N and may also be referred to as a "host system 102", "host systems 102", "server 102" or "servers 102") communicably coupled to a storage system 120 executing a storage operating system 124 and a storage services module 122 via a connection system 118 such as a local area network (LAN), wide area network (WAN), the Internet and others. As described herein, the term "communicably coupled" may refer to a direct connection, a network connection, or other connections to enable communication between computing and network devices.

System 100 also includes a management system 132 that executes instructions for a management module (or application) 134 for coordinating storage services related operations (for example, backups, restore, cloning and other operations) for a multitenant database environment, described below in detail. Although the management system 132 with the management module 134 is shown as a stand-alone module, it may be implemented with other applications, for example, within a virtual machine environment described below. Furthermore, the management system 132 and the management module 134 may be referred to interchangeably throughout this specification.

In one aspect, host systems 102 may execute a plurality of applications 126A-126N (may also be referred to as "application 126" or "applications 126"), for example, an email server (Exchange server), a database application (for example, a multitenant database application and others) and others. These applications may be executed in different operating environments, for example, a virtual machine environment, Windows, Solaris, Unix and others. The applications may use storage system 120 to store information at storage devices, as described below.

To protect information associated with each application, a plugin module (shown as application plugins 128A-128N) are executed at host systems 102. The term plugin as used in this application means a processor executable layer that is customized to interface with a specific application, e.g. a multitenant database application, a file system, an operating system and others, described below in detail. The term protect means to backup an application and/or backup associated information (including configuration information, data (e.g. files, directories, structured or unstructured data, may jointly be referred to as data containers) and others).

Each host system 102 executes an agent 130A-130N that interfaces with the management module 134 and the various application plugins for managing backups, restore, cloning and other operations, as described below in detail.

In one aspect, the storage system 120 has access to a set of mass storage devices 114A-114N (may be referred to as "storage devices 114" or "storage device 114") within at least one storage subsystem 116. The storage devices 114 may include writable storage device media such as solid state drives, storage class memory, magnetic disks, video tape, optical, DVD, magnetic tape, non-volatile memory devices for example, self-encrypting drives, or any other storage media adapted to store structured or non-structured data. The storage devices 114 may be organized as one or more groups of Redundant Array of Independent (or Inexpensive) Disks (RAID). The various aspects disclosed are not limited to any specific storage device or storage device configuration.

The storage system 120 provides a set of storage volumes to host systems 102 via the connection system 118. The storage operating system 124 can present or export data stored at storage devices 114 as a volume (or a logical unit number (LUN) for storage area network ("SAN") based storage). Each volume may be configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all the storage space in multiple storage devices, a RAID group, or any other suitable set of storage space. An aggregate is typically managed by the storage operating system 124 and identified by a unique identifier (not shown).

The storage system 120 may be used to store and manage information at storage devices 114 based on a request generated by application 126 executed by host system 102 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120. Storage system 120 receives the I/O requests, issues one or more I/O commands to storage devices 114 to read or write the data on behalf of the host system 102, and issues a response containing the requested data over the network 118 to the respective host system 102.

Although storage system 120 is shown as a stand-alone system, i.e. a non-cluster based system, in another aspect, storage system 120 may have a distributed architecture; for example, a cluster based system that may include a separate network module and storage module. Briefly, the network module is used to communicate with host systems 102, while the storage module is used to communicate with the storage devices 114, as described below with respect to FIG. 2A.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage services module 122 at the storage system 120 coordinates storage volume backups, cloning, restore and replication for different hosts and different applications. Although the storage services module 122 is shown as a single block, it may include various modules for taking backups, executing restore operations, replicating backups from one location to another and so forth. As described below, backups and other operations may be performed using the management system 132 and the management module 134. As an example, taking backups may include taking snapshots, i.e. a point-in-time copy of a storage volume. The point-in-time copy captures all the information in a storage volume. The snapshot may be used to restore a storage volume at any given time, as described below.

One or more of the host systems (for example, 102A) may execute a virtual machine environment where a physical resource is time-shared among a plurality of independently operating processor executable virtual machines (also referred to as VMs). Each VM may function as a self-contained platform, running its own operating system (OS)

and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host system) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

Referring to FIG. 1A, host system 102A provides a processor executable virtual machine environment executing a plurality of VMs 112A-112N. VMs 112A-112N execute a plurality of guest OS 104A-104N (may also be referred to as guest OS 104) that share hardware resources 110. As described above, hardware resources 110 may include CPU, memory, I/O devices, storage or any other hardware resource.

In one aspect, host system 102A may also include a virtual machine monitor (VMM) 106, for example, a processor executed hypervisor layer provided by VMWare Inc., Hyper-V layer provided by Microsoft Corporation of Redmond, Wash. or any other layer type. VMM 106 presents and manages the plurality of guest OS 104A-104N executed by the host system 102A.

In one aspect, VMM 106 is executed by host system 102A with VMs 112A-112N. In another aspect, VMM 106 may be executed by an independent stand-alone computing system, often referred to as a hypervisor server or VMM server and VMs 112A-112N are presented on another computing system.

It is noteworthy that various vendors provide different virtualization environments, for example, VMware Corporation, Microsoft Corporation and others (without derogation of any third party trademark rights). The generic virtualization environment described above with respect to FIG. 1A may be customized depending on the virtual environment provider.

VMM 106 may include or interface with a virtualization layer (VIL) 108 that provides one or more virtualized hardware resource 110 to each OS 104A-104N. VMM 106 also includes or interfaces with a hypervisor plugin (shown as application plugin 128A) and the agent 130A.

Figure 1B:
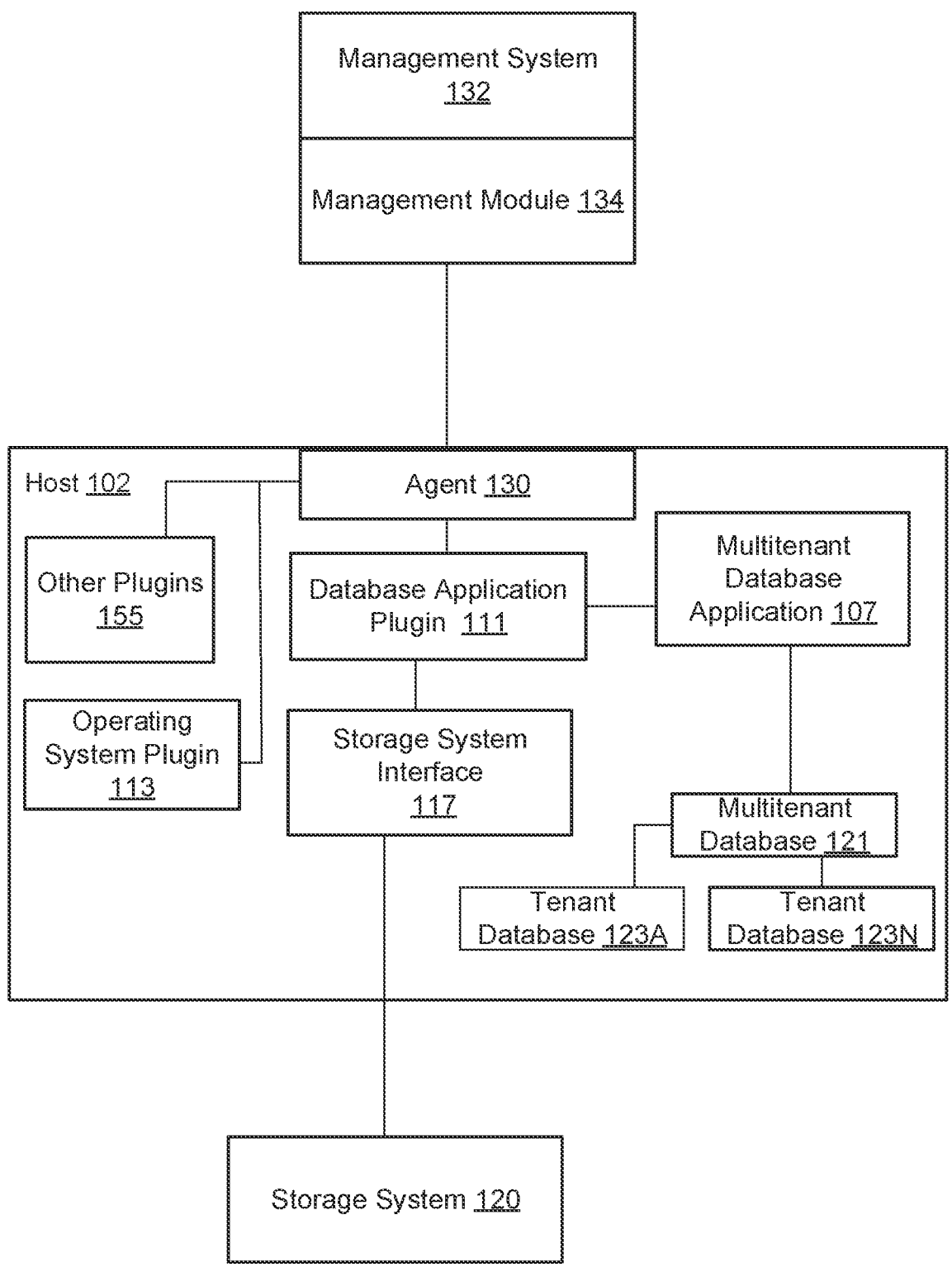
FIG. 1B shows an example of a host system executing a multitenant database system, according to one aspect of the present disclosure.

FIG. 1B shows an example of a portion of the system 100 for protecting and restoring a tenant database of multitenant database system. In an aspect, host 102 executes a multi-tenant database application 107 (may also be referred to as "application 107") that maintains a multitenant database (may also be referred to as system database) 121 associated with independent tenant databases 123A-123N (may be referred to as "tenant database 123" or "tenant databases 123"). The data associated with the tenant databases 123 is stored by the storage system 120. The system database 121 is a logical container with the multiple tenant databases 123A-123N. As an example, the system database 121 is the SAP HANA multitenant data container database. It is noteworthy that the adaptive aspects of the present disclosure are not limited to SAP HANA or any specific multitenant database.

In one aspect, to protect tenant databases 123, agent 130 (e.g. at host 102) interfaces with the management module 134 (at the management system 132) via a network connection. The agent 130 receives requests for storage services (e.g. backup and restore) either from the management system 132 or any other entity. The agent 130 provides the requests to a database application plugin (e.g. a HANA plugin) 111 (may also be referred to as plugin 111). The plugin 111 is customized for application 107 and interfaces with application 107 to perform database related discovery, backup and restore operations, as described below in detail. The plugin 111 also interfaces with an operating system plugin 113 for retrieving any operating system related information for executing storage services for host 102. A storage system interface (may also be referred to as a "file system plugin") 117 interfaces with the storage system 120 to send and receive storage related information, as described below in detail. Details of executing a backup and restore operation are provided below with respect to FIGS. 1D and 1E, respectively. The host 102 may also execute other plugins 155, besides plugins 111 and 113.

Figure 1C:
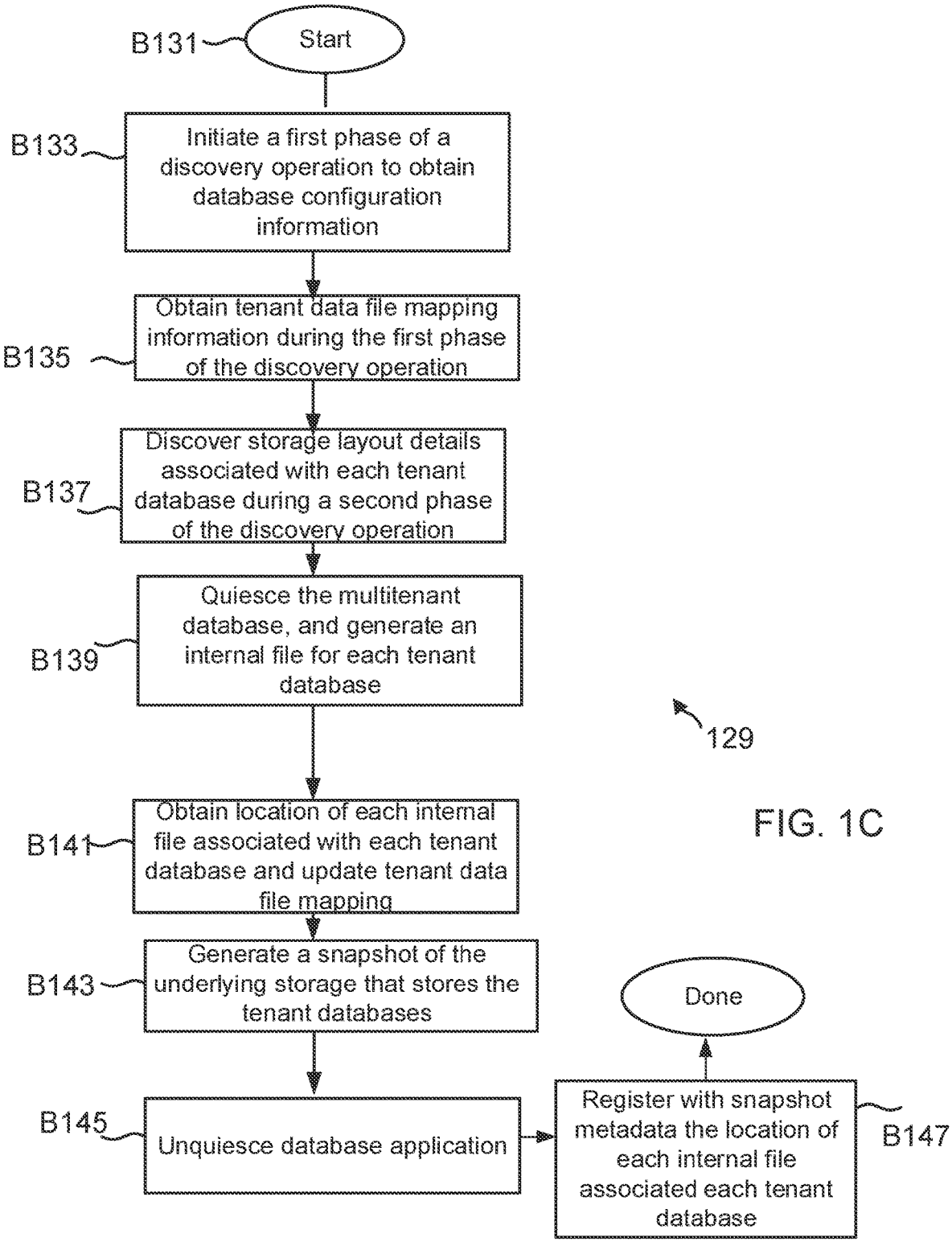
FIG. 1C shows a backup process for a multitenant database system, according to one aspect of the present disclosure.

Backup Process Flow 129: FIG. 1C shows a process 129 for backing up the system database 121 and the tenant databases 123A-123N (shown in FIG. 1B), according to one aspect of the present disclosure. As described below in detail, process 129 includes a multi-phase, discovery operation that is initiated by a discovery module 186 (see FIG. 1F) and executed by the plugin 111 interfacing with the database application 107 and the storage system interface 117. During a first phase of the discovery operation, the plugin 111 first requests high level details from the system database 121 e.g. an instance number that identifies an instance of the system database 121, a unique system identifier that uniquely identifies system database 121, names of each tenant database 123A-123N, configuration information of the system database 121 and the tenant databases 123A-123N, or any other information. The configuration information indicates to the plugin 111 the type of database 121 (e.g. whether the database supports multi-tenancy or is a single instance database) and whether the database 121 and the tenant databases 123A-123N are configured on a single or multiple hosts 102.

The second phase of the discovery operation involves authenticating a user key provided by the database application 107 to access the system database 121. The user key may be authenticated by the agent 130 and/or plugin 111. Once the user key is authenticated, the plugin 111 generates a query for the system database 121 with the user key. The query requests file paths for each tenant database 123 indicating where each tenant database 123 is stored. The system database 121 maintains the file paths for each tenant database 123. The file paths are used to provide access to tenant databases 123A-123N. The plugin 111 then stores a mapping of the individual files of each tenant database 123 with their respective file paths. This information may be stored at a mapping data structure (not shown) at host 102 memory (not shown). Thereafter, the plugin 111 uses the file paths and the mapping information to request the storage layout of each tenant database 123 from the storage system interface 117 that communicates with the storage system 120.

The storage layout information defines how each tenant database 123 is stored by the storage system 120. The storage system interface 117 obtains a mount point for a storage volume associated with the tenant databases 123. A mount point is a drive or volume in an operating system that is mounted to a folder that uses a file system. When SAN is used for storing the tenant databases 123, the storage layout provides a LUN name that identifies a LUN that stores the tenant databases, identity of a storage volume associated with the LUN, LUN size, identity of a storage server that manages the LUN, permissions associated with the LUN or any other LUN configuration details. For non-SAN based storage (e.g. Networked Attached Storage (NAS) accessed using NFS or CIFS protocols), the storage layout information includes an identity of each data volume storing tenant database 123A-123N files, a size of each data volume, or any other configuration details. The discovered information is then persistently stored (e.g. at database 176 shown in FIG. 1E and described below) and used for a restore operation, as described below.

A backup of database 121 and the tenant databases 123 is taken after a quiesce request is initiated by the plugin 111 for the database application 107. During a quiesce operation, the database application 107 generates an internal file to capture the state of the system database 121 and the tenant databases 123A-123N. The internal file may be proprietary to the database application 107. The internal file is used by the database application 107 during recovery as described below. Thereafter, a snapshot of a storage volume is taken by the storage system 120 using the storage services module 122 (of storage system 120). A location of the internal file for each tenant database 123 is mapped to the tenant database 123 and saved with the metadata of the snapshot taken by the storage system 120. The internal file location (i.e. an internal file path used by the host system 102 to access the internal file) with the snapshot metadata is also registered with the management module 134 and persistently stored, e.g. at database 176. Thereafter, an unquiesce operation is executed by the database application 111 to make the system database 121/tenant databases 123A-123N available for access and the backup operation is completed.

Referring now to FIG. 1C in detail, process 129 begins in block B131, when a backup request is received or generated by the management module 134 to back up system database 121 and tenant databases 123A/123N. The backup request is provided to the agent 130 of host 102. The agent 130 notifies the plugin 111 to initiate a first phase of a discovery operation.

In block B133, during the first phase of the discovery operation, the plugin 111 sends a query to the database application 107 requesting configuration information. The configuration information includes the name of system database 121, a unique identifier for system database 121, a database instance number that identifies an instance of the database 121, the names of the tenant databases 123A-123N, the size of the system database 121, the size of each tenant database 123A-123N, and ownership information for each tenant database indicating which entity owns a specific tenant database. The configuration information also includes any configuration files that indicate how database 121 is configured on host 102 e.g. whether the database 121 is a single instance database or supports multi-tenancy.

In block B135, for the first phase of the discovery operation, the plugin 111 first authenticates a unique user key associated with the system database 121. The unique user key may be obtained directly from a user of the system database 121. The plugin 111 generates a request for database application 107 with the unique user key to obtain information regarding tenant database file paths. The database application 107 maintains this information in system database 121. The plugin 111 then maps individual files of each tenant database 123 at a mapping file. The mapping is maintained by the plugin 111 in a memory at the host 102, and the mapping information includes the identifier for each tenant database 123, the files associated with each tenant database 123 and the file paths used to access each tenant database 123.

In block B137, during a second phase of the discovery operation, the plugin 111 requests the storage system interface 117 to provide details regarding the storage layout used by the storage system 120 to store data for each tenant database 123. The storage layout includes a mount point, identity, and size of logical objects, such as storage volumes/LUNs that may be used to store tenant database files.

Once the storage layout information is obtained, in block B139, the plugin 111 instructs the database application 107 to quiesce. This is intended to prevent modifications to the system database 121/tenant databases 123A-123N during the backup operation. The database application 107 then generates an internal file for the system database 121 and each tenant database 123A-123N. The internal file may be proprietary to the database application 107 and captures the state of each tenant database 123 when the database application 107 is quiesced for the backup.

The location of the internal files for each tenant database 123 and the system database 121 is obtained in block B141, and the mapping information maintained by the plugin 111 is updated to map each tenant database file and the system database 121 to their corresponding internal file. This mapping is used to restore a specific tenant database, as described below.

Thereafter, in block B143, a snapshot is generated of one or more volumes (or a LUN) where the tenant databases 123 are stored. This is executed by the storage services module 122. The snapshot, and the snapshot metadata are stored by the storage system 120. The snapshot metadata includes a snapshot identifier, a size of the snapshot, a location where the snapshot is stored, and the location of the internal file for the system database 121 and each tenant database 123A-123N that is used to restore a single tenant database.

In block B145, the database application 107 is unquiesced. In block B147, the snapshot metadata with the internal file location is registered with the management module 134 so that the internal file location information can be used during a restore operation, described below.

Figure 1D:
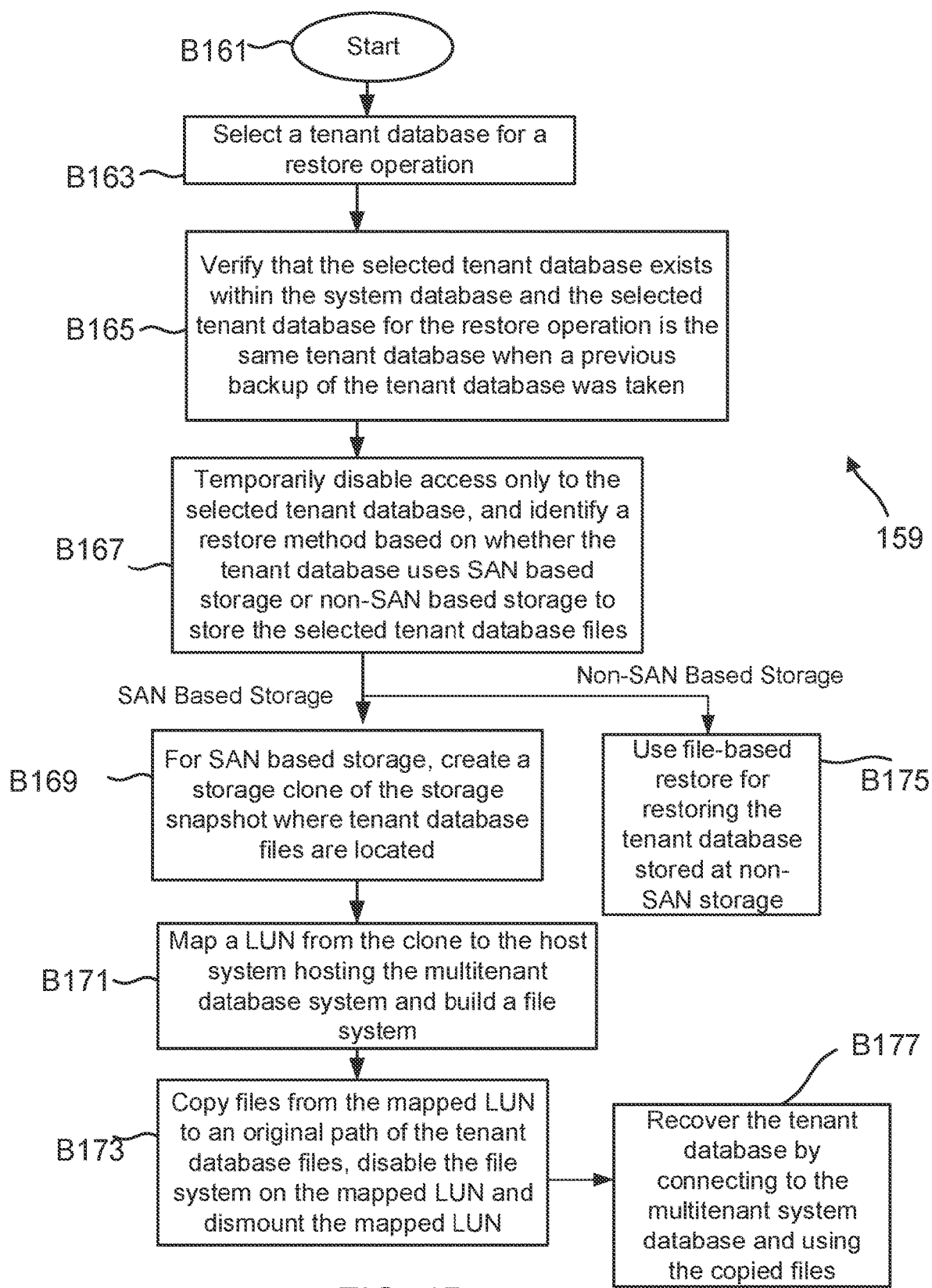
FIG. 1D shows a process for restoring a specific tenant database of a multitenant database system, according to one aspect of the present disclosure.

Restore Process Flow 159: FIG. 1D shows a process 159 for executing a recovery operation to restore a tenant database without impacting other tenant database operations in a multitenant database environment, according to one aspect of the present disclosure. To perform the recovery operation, a user may select a specific tenant database to recover. Process 159 determines the best restore mechanism based on the storage layout discovered during a backup process, described above with respect to FIG. 1C. For example, if the files of a selected tenant database reside on an NFS mount point, then the files pertaining to the tenant database selected for restore are identified from backup metadata and a file-level storage restore is performed using the identified files without affecting other tenant databases.

When the tenant database files reside on a SAN mount point (i.e. stored at SAN based storage), then all tenant database files reside in a single storage LUN. If a file-level storage restore operation is executed, then it will adversely impact other tenant databases, since they are all included in the same LUN. Process 159 utilizes a "connect-and-copy" approach to restore a tenant database. In this approach, a clone of the storage volume is created, a LUN from the cloned volume is mapped to the host 102 that hosts system database 121, a file system is built on the mapped LUN, and the required tenant database files are selectively copied from the mounted LUN to an original tenant database's file path. This approach enables selective recovery of a tenant database while other tenant databases continue to process requests to read and write information.

Referring now to FIG. 1D, process 159 begins in block B161, after a backup of system database 121 and tenant databases 123A-123N has been taken using the process blocks of FIG. 1C described above.

In block B163, a tenant database 123 is selected for a restore operation. The selection may be received by a GUI module (e.g. 142, FIG. 1E) or received by host 102. A restore command may be sent by the management module 134 to the agent 130. The restore command identifies the tenant database 123 by name and a unique identifier. The agent 130 then initiates the plugin 111 to begin the restore operation.

In block B165, the plugin 111 performs a plurality of checks. For example, the plugin 111 first verifies with the system database 121 to determine that the selected tenant database 123 exists within an active database file system of the database application 107. If the selected tenant database 123 does not exist, then the restore operation is aborted. If the tenant database 123 exists within the system database 121, then the plugin 111 verifies that a current (i.e. at the time of the restore operation) tenant database identifier matches the tenant database identifier that was used during the backup operation. The plugin 111 performs the verification by retrieving the current tenant database identifier from the system database 121 and comparing the retrieved identifier with snapshot metadata that stores tenant database identifiers and the internal file location of each tenant database 123. If the tenant database identifiers are different, the restore operation is aborted.

When the tenant database identifier matches with the current identifier, then access to the tenant database 123 is temporarily disabled in block B167. It is noteworthy that other tenant databases 123 continue to operate during the restore operation. A restore method is then identified based on the type of storage used to store the tenant database files. For example, if the tenant database 123 uses SAN based storage i.e. a single LUN to store the system database 121 and tenant databases 123A-123N, then process blocks B169-B173 are executed. If the tenant database uses non-SAN based storage (e.g. NFS), then file based restore operation is selected and executed in block B175.

For SAN based storage, in block B169, a clone volume is created of the storage snapshot that includes the tenant database files. The storage services module 122 is provided information regarding the storage snapshot by the storage system interface 117 to enable generating the snapshot clone volume.

In block B171, a LUN from the cloned volume is mapped to the host 102 that hosts the system database 121. A file system is then built at the mapped LUN using the storage system interface 117.

In block B173, the selected tenant database files from the mapped LUN are selectively copied by the storage system interface 117 to the original path of the tenant database 123 that was recorded in the snapshot metadata with the internal file location for each tenant database 123. The filesystem on the mapped LUN is disabled using the storage system interface 117 and the clone is dismounted.

From block B173, the process 159 proceeds to block B177. In block B177, the tenant database files are recovered from the copied files and connected to the system database 121. In order to perform a full recovery, the system database 121 uses the internal file it created for the tenant database that is being restored. Since the internal file location was stored with the snapshot metadata for the selected tenant database, the internal file location is easily retrieved by the storage system interface 117 and provided to the plugin 111. The plugin 111 provides the internal file location to the database application 107 retrieves the internal file from the internal file location and uses the retrieved internal file and the recovered tenant database files to restore the tenant database 123 to the same state logged in the internal file.

For non-SAN based storage, in block B175, the tenant database files are restored using file based restore i.e. individual files are restored from the backup operation of FIG. 1C. The information regarding each tenant database file is provided by the storage system interface 117 to the storage system for the restore operation.

In one aspect, a method for restoring a tenant database from a plurality of tenant databases is provided. The method includes verifying (Block B165, FIG. 1D) in response to a request to restore a first tenant database from a plurality of tenant databases of a multitenant database system that the first tenant database is present in the multitenant system database system with a same identifier when a backup of the first tenant database was taken during a backup operation and when the restore request was received; selecting a restore method (Block B167, FIG. 1D) for restoring the first tenant database, the restore method based on a storage type used for storing the first tenant database; and executing the selected restore method (Blocks B169-B177 or block B175) for restoring the first tenant database utilizing an internal file associated with the first tenant database, while processing requests for other tenant databases of the plurality of tenant databases. The internal file is generated by a database application (e.g. 107, FIG. 1B) upon receiving a quiesce request from a plugin (e.g. 111, FIG. 1B) associated with the database application during the backup operation (block B139, FIG. 1C), wherein a location of the internal file is stored with metadata of the backup by a storage system (block B147, FIG. 1C) and provided to the database application by the plugin for restoring the first tenant database.

In another aspect, a non-transitory, machine readable storage medium having stored thereon instructions for performing a method is provided. The machine executable code which when executed by at least one machine, causes the machine to: verify in response to a request to restore a first tenant database from a plurality of tenant databases of a multitenant database system that the first tenant database is present in the multitenant system database system with a same identifier when a backup of the first tenant database was taken during a backup operation and when the restore request was received; select a restore method for restoring the first tenant database, the restore method based on a storage type used for storing the first tenant database by a storage system; and execute the selected restore method for restoring the first tenant database utilizing an internal file associated with the first tenant database, while processing requests for other tenant databases of the plurality of tenant databases. A location of the internal file is stored with metadata of the backup by the storage system and provided to a database application for restoring the first tenant database.

In yet another aspect, a system having a memory containing machine readable medium comprising machine executable code having stored thereon instructions; and a processor coupled to the memory is provided. The processor is configured to execute the machine executable code to: verify in response to a request to restore a first tenant database from a plurality of tenant databases of a multitenant database system that the first tenant database is present in the multitenant system database system; select a restore method for restoring the first tenant database, the restore method based on a storage type used for storing the first tenant database by a storage system; and execute the selected restore method for restoring the first tenant database utilizing an internal file associated with the first tenant database, while processing requests for other tenant databases of the plurality of tenant databases. A location of the internal file is stored with metadata of the backup by the storage system and provided to a database application for restoring the first tenant database.

In one aspect, the innovative processes and systems described herein are rooted in computing technology that enable a multitenant database system to restore a specific tenant database without impacting other tenant databases. The disclosed computing technology improves the functionality of a host system by providing access to tenant databases that are not related to the specific tenant database that is being restored at a given time. Because other tenant databases continue to function while the specific tenant database is being restored, this reduces disruption for client computing devices using a multiple tenant database system to store and retrieve data.

Figure 1E:
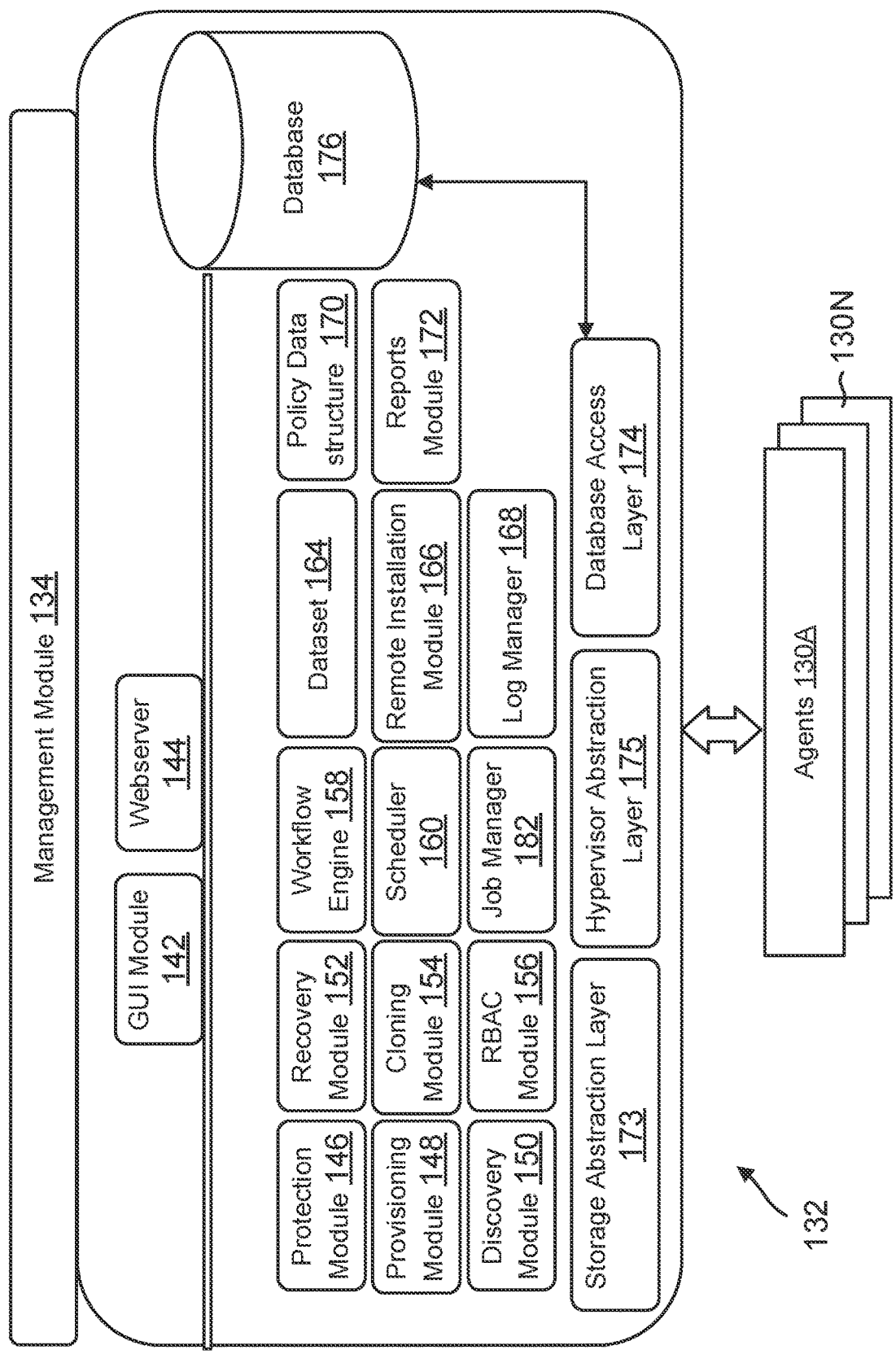
FIG. 1E shows a block diagram of a management module used for backup and restore of a multitenant database system, according to one aspect of the present disclosure.

Management System 132: FIG. 1E shows a block-level diagram of the management system 132 with the management module 134, according to one aspect of the present disclosure. The management module 134 may be executed by a stand-alone system or may interface with another management console/application to manage and interface with multiple instances of agents' 130A-130N. The management module 134 may also be implemented as an application within a VM environment of host 102A.

The management module 134 includes a graphical user interface (GUI) module 142 that presents a GUI at a display device, for example, a monitor, a smart phone, tablet or any other display device type. The GUIs may be used by different users to interface with the management system 132 and its components, for example to backup and restore a tenant database 123A-123N, as described above. It is noteworthy that the various aspects described herein are not limited to any specific GUI type because a command line interface (CLI) may also be used to implement the adaptive aspects described herein.

The management module 134 may also include a web server 144 for enabling Internet based communication. As an example, web server 144 may be implemented as an Internet Information Services (IIS) for a Windows® Server web server (without derogation of any third party trademark rights). The web server 144 interfaces with a workflow engine 158 that coordinates and manages various tasks that are performed by the different components of the management module 134.

In one aspect, the workflow engine 158 coordinates dataset 164 creation, policy allocation and manage a database 176 that is different from the databases 121/123A-123N, described above. The workflow engine 158 communicates with various agents 130A-130N for host system related operations including backup and restore of databases 121/123A-123N.

In one aspect, the management module 134 also includes a protection module 146, a provisioning module 148, a discovery module 150, a recovery module 152, a cloning module 154, a role based access control (RBAC) module 156, a storage abstraction layer (may also be referred to as "SAL") 173, a hypervisor abstraction layer (may also be referred to as "HAL") 175, a scheduler 160, a job manager 182, a remote installation module 166, a log manager 168, a policy data structure 170, a reports module 172 and a database access layer 174 that can access the database (or any other data structure type) 176. The database 176 stores various data structures (or objects) in a format that allows the management module 134 to handle storage services for different applications/host systems.

The log manager 168 collects logs from agents 130 and the various plugins. The logs can then be presented to a user via a GUI. The logs may be for event management and audit for various management system 132 operations. The logs may be collected for a job based on a job identifier.

The protection module 146 is used to enforce a policy for a storage services related job (e.g. backup and/or restore of a tenant database). The protection module 146 maintains a protection policy for a plurality of objects (or protection group) that are to be backed up and provides protection service for backing up the protection group objects. Based on an application object, a call is made to an appropriate plugin for providing the appropriate protection service.

In one aspect, protection module 146 maintains protection group objects for abstract representation of a container of application objects where protection of application objects is defined by policy objects. The protection group objects map to dataset objects 164 (shown as dataset 164).

The provisioning module 148 allows a user to configure and provision a LUN/volume (used interchangeably) that may be used to store information (e.g. for a multitenant database system). The provisioning module 148 allows a user to set a LUN size and appropriate permissions for using the LUN, for example, reading and writing data, permission for changing a LUN size, deleting a LUN and other operations. Storage volume information is saved in a standard format at database 176 and includes, name of the storage volume, storage connection identifier (described below), size, a junction path, date volume was created and an aggregate.

The discovery module 150 interfaces with the agents 130A-130N executed at different host systems to obtain information regarding the host systems, storage resources used by various applications and information regarding data containers that are protected (i.e. backed up) and unprotected. The discovery module 150 also facilitates discovery and management of application specific objects, for example, VMs, databases, hypervisor and others. Based on the application type, an appropriate plugin is used to discover different objects.

In one aspect, the discovery module 150 initiates a discovery operation with the agents 130. An application programming interface (API) presented by the management system 132 determines if an agent 130 is installed at a host 102. If the agent 130 is installed, then the agent 130 discovers the various plugins at that host 102. If the agent 130 is not installed, then it is installed by the remote installation module 166 and the appropriate plugins are installed as well.

The cloning module 154 is used to clone storage volumes that are maintained by the storage system 120. The cloning module 154 is also used for managing the life cycle of a clone. The term clone as used herein is a duplicate copy of a snapshot. The term clone life cycle management means generating a clone, refreshing a clone and deleting a clone based on user defined policies and requirements. Refreshing a clone means deleting an existing clone, generating a new snapshot and then creating the clone again.

The RBAC module 156 stores information regarding different clients/entities that are given access to storage. For example, a business unit may be allowed to read certain storage volumes and may not be allowed to backup, clone, replicate or delete any storage volume. The RBAC module 156 manages the various roles and access type for different applications that may be executed in different host systems/computing environments including a multitenant database environment described above.

In one aspect, RBAC module 156 includes an authentication and authorization module. User authentication may happen at multiple end points, for example, via a GUI login, a login API for clients or plugins and others. The authentication module authenticates users against different domain/subsystem requirements, for example, an Active Directory, a local Windows machine host system, open LDAP (lightweight directory protocol) and others. Once a user is authenticated, an encrypted token is generated based on user information. In another aspect, a hash token is generated based on the generated token. The hashed token is saved at database 176. The hashed token may be based on MD5 (Message Digest Algorithm, 5, SHA (secure hash algorithm)-1 or any other technique.

When the authenticated user logs back in, the user passes the token and the management system 132 decrypts the token, validates the token and regenerates the hash value. The hash value is compared with the stored hash value in database 176.

In one aspect, the authorization module of the RBAC module 156 creates custom roles (for example, an administrator, backup administrator, backup operator, backup viewer, restore administrator and others), modifies existing roles, assigns and unassigns permissions to and from a role (for example, a dataset, policy, host, storage connection, a dashboard, a report, discovery, remote installation and others), assigns and unassigns users to roles and assigns and unassigns resources (for example, hosts, datasets, policy and others).

In one aspect, roles determine a set of capabilities that are available to members of the role. For example, a backup administrator may be allowed to add a host system, add a tenant database, install plugins, create a dataset, create a backup dataset, delete a dataset, create policies, delete backups, restore applications and others. A backup operator may be allowed to start and stop existing dataset jobs, monitor backups, view backup reports and perform application level restore operations. A backup viewer may be given read only access to backups, view existing backups and review job session details. A restore administrator may be allowed to perform restore operations using existing backups of multitenant databases. The adaptive aspects described herein are not limited to these roles.

All the tasks conducted by the management module 134 are organized and monitored by the job manager 182. The job schedules are managed by the scheduler 160. When a new job arrives (e.g. to take a backup of database 121/databases 123A-123N), the job manager 182 stores the job information in a database (for example, 176) with other existing jobs. The job manager 182 creates sub-tasks for executing the appropriate workflows. The sub-tasks depend on the nature of the job (for example, backup, restore, cloning or others). The job manager 182 updates the status of each task to provide real-time updates via a GUI.

In one aspect, the policy data structure 170 is used to store polices for different stored objects (for example, databases 121/123A-123N, data structures, VMs, storage volumes and others). The policy information is configurable and may be changed by a user. In one aspect, the policy data structure 170 format is the same across different applications. This enables the management module 134 to manage storage services across different platforms with different requirements and operating parameters. The policy data structure 170 includes various policy objects to store various policies each with a set of attributes that can be applied to any dataset. The policy object stores a policy identifier, a policy name, description, a backup schedule policy, a retention count as to how long a backup is to be retained, a replication policy to replicate a backup from one location to another, types of backups, application consistent backups, and verification policies to verify a backup and others. It is noteworthy that a policy object may be shared across multiple datasets for multiple applications/plugins.

The reports module 172 is used to provide reports to users. The reports may be for different applications and in different formats.

In one aspect, the management module 134 maintains the dataset 164 for different applications and application objects, including databases 121/123A-123N. Each dataset is uniquely identified and named. The dataset format for managing replication for different applications is the same, regardless of how the applications handle information. A dataset may be associated with a policy data structure that defines how an object is to be protected. The dataset format used by the various aspects of the present disclosure allows a user to add or remove stored objects that need to be protected.

In one aspect, dataset 164 represents a container of application objects where protection attributes may be defined in terms of backup policy, replication profiles and retention policies. Dataset 164 is a basic unit that is used to manage backup and restore operations described above. A user can add any permissible resource to the dataset from multiple host systems/applications.

The database access layer 174 saves information in the database 176. The database 176 may be used to store information that is discovered by the discovery module 150, policy information, host information, datasets and other information.

In one aspect, the database 176 may store various data structures for managing the storage services and providing status to users. As an example, the database schema for the database 176 is application format independent and may include various data structures to identify different host systems to specific login information, a backup metadata structure for storing information regarding backups including the internal file location of an internal file generated by the database application 107 (FIG. 1B), a data structure to map backups to stored objects including VMs, databases and others, a data structure for storing information on backup types, i.e. application consistent, full backup, copy backup, log backup for identifying volumes that are involved in each backup, a data structure to track various jobs that are managed by the job manager 182, discovery objects for storing information that is discovered by the discovery module 150, policy data structure 170, storage footprint and storage resource information, a data structure for storing information regarding various plugins, roles, role attributes, storage connections and user information, including credentials.

In one aspect, SAL 173 stores information regarding the various storage resources that are used and available for different hosts including host 102 of FIG. 1B that hosts a multitenant database system (FIG. 1B). SAL 173 maintains a "storage footprint" or storage layout for different storage resources (for example, storage systems including storage devices) used by different applications as described below in detail.

In one aspect, HAL 175 is used to communicate with another plugin that is used to collect information related to storage used by different virtual machines.

Figure 1F:
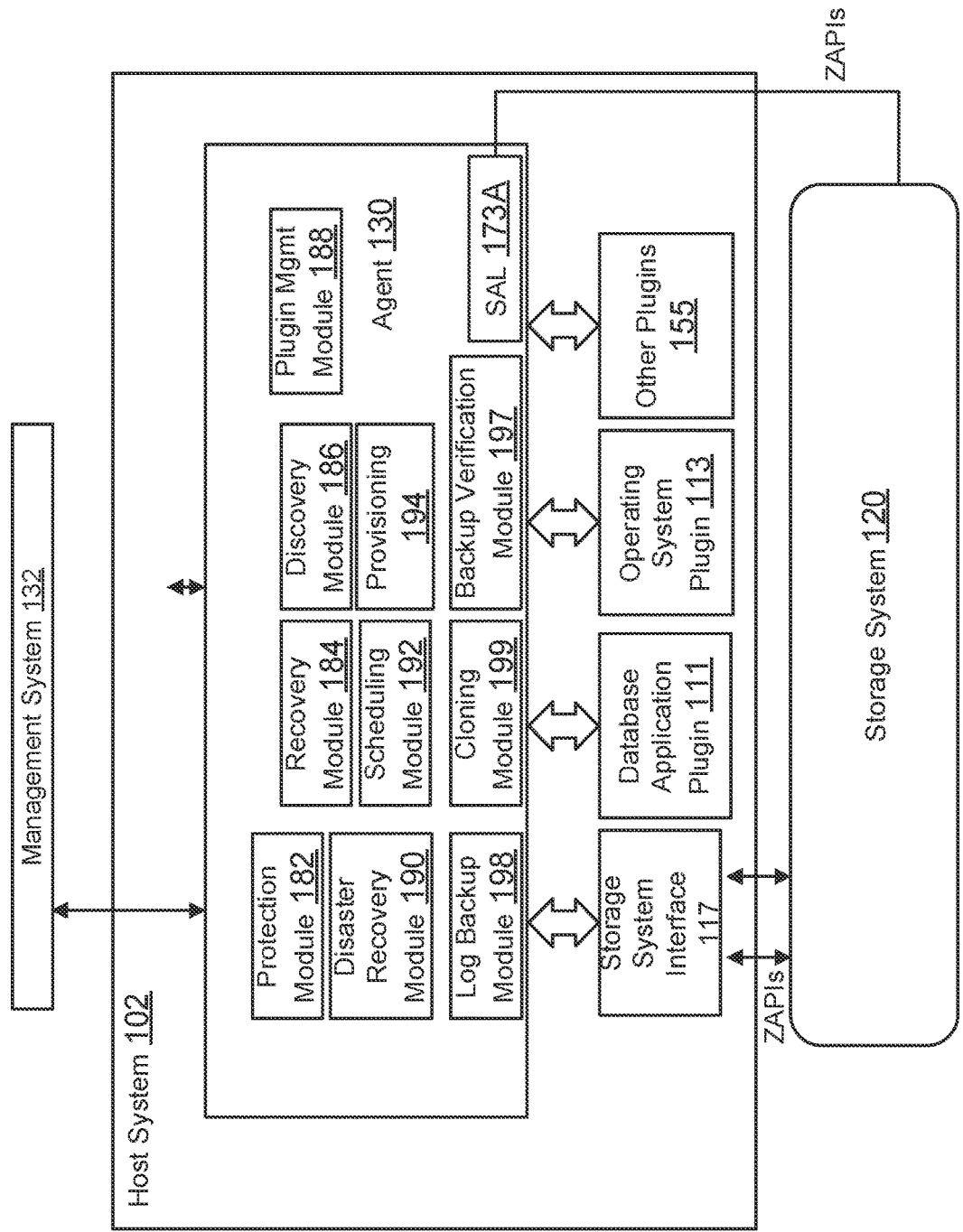
FIG. 1F shows a block diagram of an agent used by a computing system (or host system) for interfacing with the management module and other components of FIG. 1A, according to one aspect of the present disclosure.

Agent 130: FIG. 1F shows an example of the agent 130 that interfaces with the management system 132 and the various plugins shown in FIG. 1B, according to one aspect. The agent 130 includes a protection module 182 to manage and coordinate backup operations for multitenant databases, a recovery module 184 to manage and coordinate restore operations to restore a tenant database, a discovery module 186 to manage and coordinate discovery operations described above with respect to FIG. 1C, a plugin management module 188 to manage plugin installation at host 102, a disaster recovery module 190 to manage and coordinate disaster recovery operations, a scheduling module 192 to schedule tasks, for example, backup and restore operations described above, a provisioning module 194 for provisioning computing and storage resources (e.g. for a tenant database of a multitenant database system), a log backup module 198 for managing logs for backup operations, a cloning module 199 for managing cloning operations, a backup verification module 197 for managing and coordinating backup verification operations and SAL 173A for communicating with the storage system 120.

SAL 173A maintains the storage footprint/layout for each application. SAL 173A interfaces with each plugin (e.g. plugin 111) to obtain storage resources that are managed by storage system 120 and made available to different applications. In one aspect, SAL 173A uses ZAPIs (Zephyr Application Programming Interface) to send and receive data from storage system 120.

In another aspect, the agent 130 interfaces with storage system 120 via the storage system interface 117. An example of storage system interface is SnapDrive provided by NetApp Inc. (with derogation of any trademark rights of NetApp Inc.).

The agent 130 interfaces with different types of plugins, for example, plugins 111, 113 and 155. The plugin 111 is aware of database 121 format and configuration and provides database specific information to the agent 130.

The backup verification module 197 verifies a backup or replication operation. Since different applications may have different requirements, the backup verification module 197 facilitates the verification for different applications.

The cloning module 199 assists in cloning a snapshot and a log backup module 198 assists in backing up logs. As an example, a database application 107 (FIG. 1B) may maintain a log to track changes to a database and the log backup module 198 assists in backing up those logs.

Figure 2A:
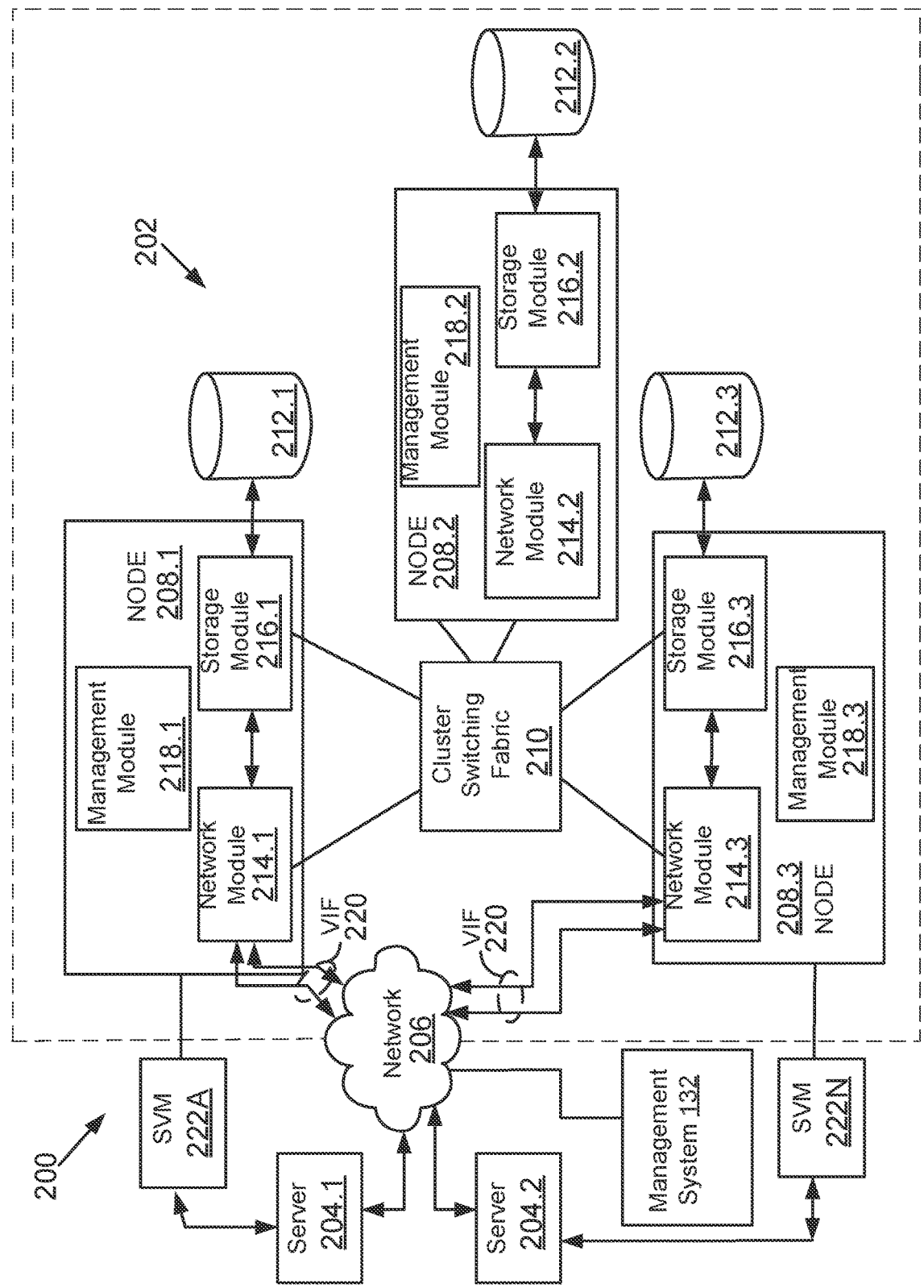
FIG. 2A shows an example of a cluster-based storage system, used according to one aspect of the present disclosure.

Clustered Storage System: FIG. 2A depicts an illustrative aspect of a shared, storage environment 200, similar to storage system 120. The shared, storage environment 200 includes the management system 132 described above, a plurality of server systems 204.1-204.2 (similar to server systems 102), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 118, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 (similar to host systems 102A-102N of FIG. 1A) of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
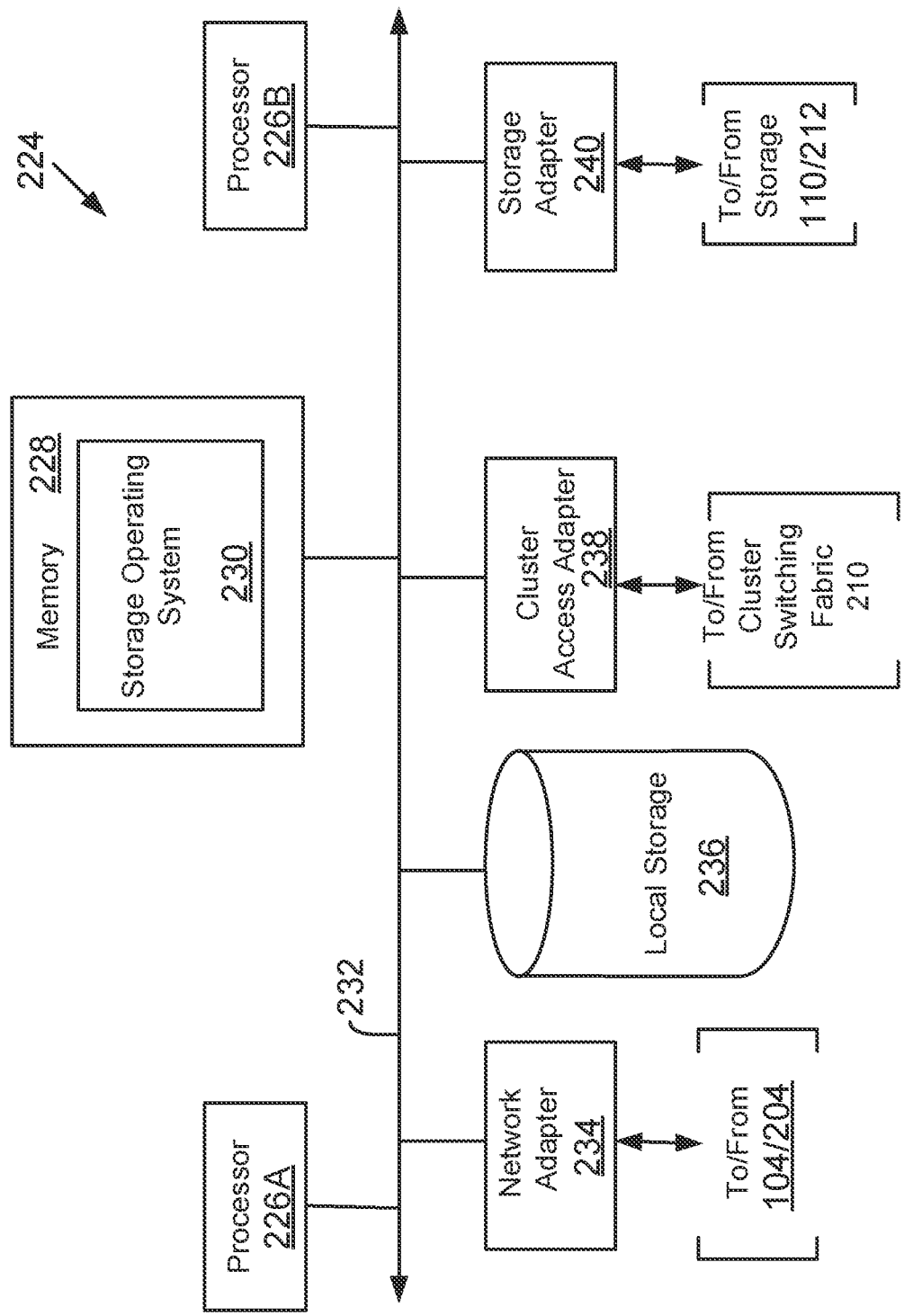
FIG. 2B shows an example of a storage system node, used according to one aspect of the present disclosure.

Storage System Node: FIG. 2B is a block diagram of a system 224, according to one aspect. System 224 may be used by a stand-alone storage system 120 and/or a storage system node operating within a clustered storage system node for performing various storage services described above with respect to FIGS. 1C and 1D. System 224 communicates with SAL 173A and/or storage system interface 117 for providing information regarding stored objects, backups, clones, restore operations and others as described above.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 (similar to 124, FIG. 1A) that preferably implements a high-level module, such as a file system, to logically organize information as a hierarchical structure of named directories, files and special types of files called virtual disks (hereinafter generally "blocks") on storage devices 114/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 120. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 120 to the network. Illustratively, the computer network may be embodied as an Ethernet network or a FC network.

The storage adapter 240 cooperates with the storage operating system 230 executing on the system 224 to access information requested by the management system 132 and/or host 102. The information may be stored on any type of attached array of writable storage device media such as optical devices, DVD, magnetic tape, bubble memory, electronic random-access memory, flash memory devices, micro-electro mechanical and any other similar media adapted to store information.

The storage adapter 240 comprises a plurality of ports having input/output (I/O) interface circuitry that couples to storage devices over an I/O interconnect arrangement, such as a conventional high-performance, FC link topology.

In another aspect, instead of using a separate network and storage adapter, a converged adapter is used to process both network and storage traffic.

Figure 3:
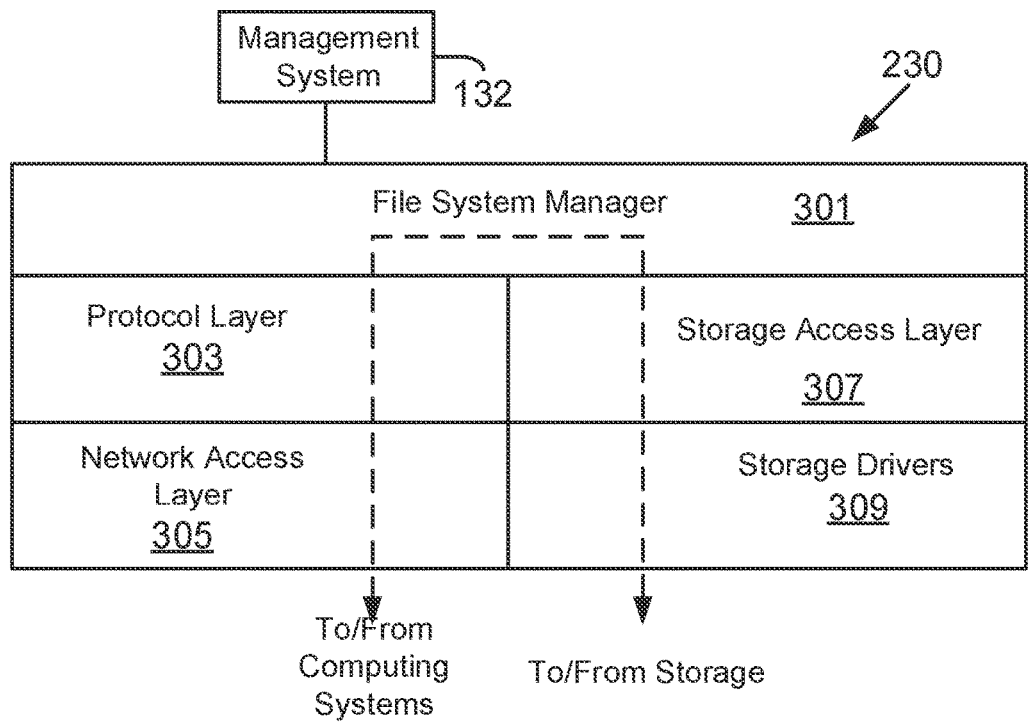
FIG. 3 shows an example of a storage operating system, used according to one aspect of the present disclosure.

Storage Operating System: FIG. 3 illustrates a generic example of storage operating system 230 (or 124) executed by storage system 120 and interfacing with the management system 132 and storage system interface 117/SAL 173A, according to one aspect of the present disclosure. The storage operating system 230 maintains various stored objects and data containers. Storage system interface 117 and/or SAL 173A communicates with different layers of storage operating system 230 for providing storage services in system 100 including backing up and restoring a tenant database 123A/123N, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on storage devices in response to server system 102 requests.

Operating system 230 may also include a protocol layer 303 and an associated network access layer 305, to allow system 200 to communicate over a network with other systems, such as server system 102 and management system 132. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 102 and mass storage devices 114/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level storage protocol, such as RAID (redundant array of inexpensive disks), while the storage driver layer 309 may implement a lower-level storage device access protocol, such as FC, SCSI or any other protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
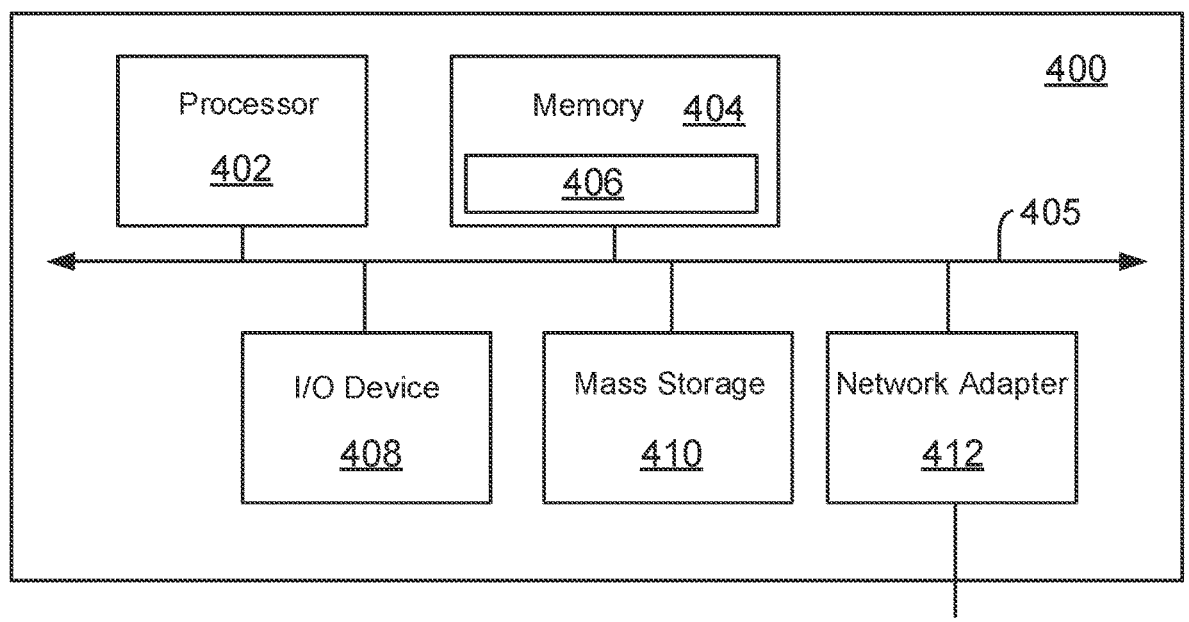
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of the management system 132, host 102, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 1C and 1D, agent 130, management module 134 and the various plugins/applications.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure, followed by a "server" layer that includes hardware and computer software designed for cloud specific services. The storage systems described above can be a part of the server layer for providing storage services. Details regarding these layers are not germane to the inventive aspects.

Thus, a method and apparatus for protecting multitenant databases have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method for restoring a first tenant database from a backup, the first tenant database one of a plurality of tenant databases of a multitenant database instance, the method comprising:

verifying, by a processor, for a restore operation that the first tenant database has a same identification when the backup was taken and at a time of the restore operation confirming the presence of first tenant database in the multitenant database instance, wherein the multitenant database instance is configured as a logical container to present the plurality tenant databases;

selecting, by the processor, a restore method for restoring the first tenant database, the restore method based on using a storage area network ("SAN") or a non-SAN based storage system type for storing the first tenant database; and utilizing, by the processor, an internal file associated with the first tenant database for the restore operation to restore the first tenant database by the selected restore method, while processing requests for other tenant databases of the plurality of tenant databases, wherein the internal file is generated by a database application to capture a state of the multitenant database instance and a state of the first tenant database when the backup of the first tenant database was taken, and a location of the internal file is stored with metadata of the backup by a storage system and provided to the database application for the restore operation.

2. The method of claim 1, wherein verifying the first tenant database is present in multitenant database instance further comprising:

comparing, by the processor, a current identifier of the first tenant database with an identifier of the first tenant database in backup metadata generated when the backup was taken, prior to receiving a restore request for the restore operation to restore the first tenant database.

3. The method of claim 1, further comprising:

generating, by the processor, a clone of the backup, in response to the SAN based storage system type storing the first tenant database;

mapping, by the processor, the clone to a computing system hosting the multitenant database instance for selectively copying files of the first tenant database; and restoring, by the processor, the first tenant database using the selectively copied files and the internal file.

4. The method of claim 3, further comprising:

deleting, by the processor, the clone after the first tenant database is restored.

5. The method of claim 1, further comprising:

retrieving, by the processor, information regarding data files corresponding to each of the plurality of tenant databases and mapping each tenant database to a corresponding data file with a file path indicating a storage location where each data file is stored.

6. The method of claim 5, further comprising:

utilizing, by the processor, the mapping of each tenant database to the corresponding data file to retrieve a storage layout for each tenant database, based on which the backup is generated.

7. The method of claim 1, further comprising:

executing, by the processor, a file-based restore method for restoring the first tenant database, in response to the first tenant database being stored at the non-SAN based storage type.

8. A method executed by one or more processors for backing up a multitenant database instance having a plurality of tenant databases, the method comprising:

during a first phase of a discovery operation, retrieving, by a first plugin, configuration information regarding the multitenant database instance and the plurality of tenant database from a database application managing the multitenant database instance, and authenticating a unique user key associated with the multitenant database instance to access the tenant databases and, information regarding data files corresponding to each of the plurality of tenant databases;

mapping, by the plugin, each tenant database to a corresponding data file with a file path indicating a storage location where each data file is stored;

during a second phase of the discovery operation, utilizing, by the first plugin, the mapping of each tenant database to the corresponding data file to retrieve a storage layout of each tenant database from a storage system storing data for each tenant database;

generating, by the database application, an internal file to capture a state of the multitenant database instance and a state of each tenant database, in response to receiving a command from the first plugin to prevent modification of the multitenant database instance and the plurality of tenant databases;

mapping, by the first plugin, a storage location of each internal file to a corresponding tenant database;

generating, by the storage system, a backup of the multitenant database instance and the plurality of tenant databases; and storing the storage location of each internal file with backup metadata.

9. The method of claim 8, further comprising:

requesting, by the first plugin, the storage layout from a storage system interface to retrieve the storage layout from the storage system.

10. The method of claim 8, wherein the configuration information indicates multitenancy of the multitenant database instance.

11. The method of claim 8, wherein the database application is unquiesced, after the backup is taken to enable modification to the multitenant database instance and the plurality of tenant databases.

12. The method of claim 8, further comprising:

selecting, by the first plugin, a restore method for restoring a first tenant database, the restore method based on a storage system type used for storing the first tenant database; and utilizing, by the database application, the internal file associated with the first tenant database to restore the first tenant database by the selected restore method.

13. The method of claim 12, further comprising:
checking, by the first plugin, a backup identifier of the first tenant database is same when the backup was taken, prior to receiving a restore request to restore the first tenant database.

14. The method of claim 12, further comprising:
generating, by the storage system, a clone of the backup, in response to a SAN based storage system type storing the first tenant database;
mapping, by a second plugin, the clone to a computing system hosting the multitenant database instance for selectively copying files of the first tenant database;
restoring, by the database application, the first tenant database using the selectively copied files and the internal file; and
deleting, by the storage system, the clone after the first tenant database is restored.

15. The method of claim 12, further comprising:
executing, by the first plugin, a file-based restore method for restoring the first tenant database, in response to the first tenant database being stored at a non-SAN based storage type.

16. A system, comprising:
a memory containing machine readable medium comprising machine executable code having stored thereon instructions for a plugin interfacing with a database application of a multitenant database instance having a plurality of tenant databases, the multitenant database instance configured as a logical container to present the plurality tenant databases; and a processor coupled to the memory, the processor configured to execute the machine executable code to:
verify, by the plugin, for a restore operation to restore a first tenant database that the first tenant database is present in the multitenant database instance with a same identifier when a backup of the first tenant database was taken during a backup operation;
select, by the plugin, a restore method for the restore operation based on using a storage area network ("SAN") or a non-SAN based storage system type for storing the first tenant database;
provide, by the plugin, a storage location of an internal file associated with the first tenant database to the database plugin for the restore operation, the internal file generated by the database application to capture a state of the multitenant database instance and a state of the first tenant database when the backup was taken, and the storage location of the internal file is stored with metadata of the backup by a storage system; and
restore, by the database application, the first tenant database utilizing the internal file associated with the first tenant database, while processing requests for other tenant databases of the plurality of tenant databases.

17. The system of claim 16, wherein the processor further causes the machine executable code to:
create, by the storage system, a clone of the backup, in response to the SAN based storage type used for storing the first tenant database and map the clone to a computing system hosting the multitenant database instance for selectively copying files of the first tenant database; and
restore, by the database application, the first tenant database using the selectively copied files and the internal file.

18. The system of claim 16, wherein the processor further causes the machine executable code to:
retrieve, by the plugin, information regarding data files corresponding to the plurality of tenant databases and map each tenant database to a corresponding data file with a file path indicating a storage location of where each data file is stored.

19. The system of claim 18, wherein the processor further causes the machine executable code to:
utilize the mapping of each tenant database to the corresponding data file to retrieve a storage layout for each tenant database, based on which the backup is generated.

20. The system of claim 16, wherein the processor further causes the machine executable code to:
execute a file-based restore method for restoring the first tenant database, in response to the first tenant database being stored at the non-SAN based storage type.

* * * * *